United States Patent [19]

Seidenbusch

[11] 4,042,798
[45] Aug. 16, 1977

[54] MOUNTING DEVICE FOR COMPRESSION SPRING

[75] Inventor: Heinz Seidenbusch, Sulzbach Rosenberg, Germany

[73] Assignee: Siemens Aktiengesellschaft, Munich, Germany

[21] Appl. No.: 595,495

[22] Filed: July 14, 1975

[30] Foreign Application Priority Data

July 31, 1974 Germany .............................. 2436885

[51] Int. Cl.² ............................................. H01H 1/20
[52] U.S. Cl. .................................... 200/243; 335/192
[58] Field of Search ...................... 200/243, 161, 16 A, 200/163, 159 R, 165; 335/192, 193, 194, 195

[56] References Cited

U.S. PATENT DOCUMENTS 3,064,104  11/1962  Wells et al. .................... 200/16 A X

OTHER PUBLICATIONS

German Printed Application, Auslegeschrift, Müller et al., Published Nov. 17, 1960.

Primary Examiner—Robert K. Schaefer
Assistant Examiner—Morris Ginsburg
Attorney, Agent, or Firm—Kenyon & Kenyon, Reilly, Carr & Chapin

[57] ABSTRACT

The device includes a carrier having first and second openings which are interconnected by a breakthrough opening. A pull bracket, including a main portion which seats in one opening of the carrier and a pair of arms extending into the second opening through the breakthrough, retains the compression spring in the second opening. The arms positioned within the coils extend the length of the spring and just beyond where they are bent back along their longitudinal axis. A retainer washer is provided which has suitably dimensioned cutouts facilitating placement of the washer over the bent arms which then lock it in position to thereby retain the spring.

2 Claims, 4 Drawing Figures

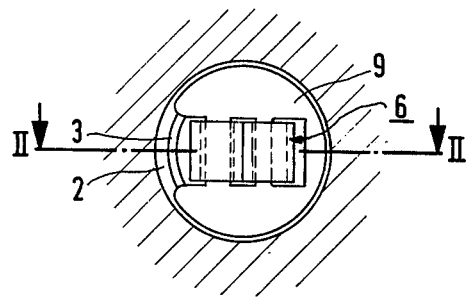
Fig. 1
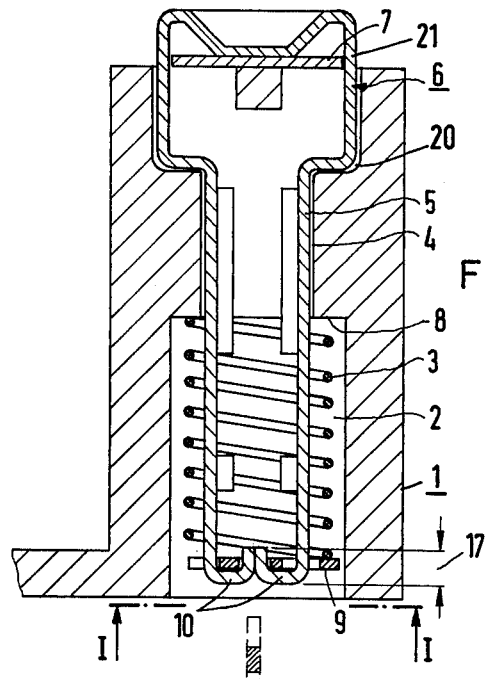
Fig. 2
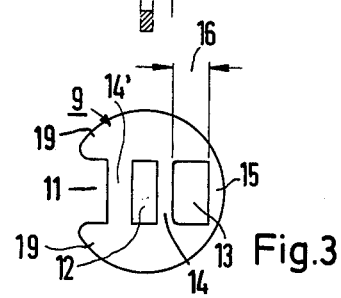
Fig. 2A
Fig. 3

4,042,798

MOUNTING DEVICE FOR COMPRESSION SPRING

BACKGROUND OF THE INVENTION

The invention relates to a mounting device for a compression spring, and more particulary to a contact pressure spring for electrical switching apparatus such as described and illustrated in the German Auslegeschrift 1,092,989.

In one known mounting device of the type mentioned above (German Auslegeschrift 1,092,989), the bent ends of the bracket arms are designed to rest against the last turn of the spring. The other end of the spring is supported in a cup-shaped mounting by a latch which is inserted into the cup transverse to the longitudinal axis of the spring. Apart from the fact that the bracket arms surround the spring on the outside, increasing the space required, there is difficulty in automating the assembly of such an arrangement.

Attempts have been made to dispose the arms inside the spring. The spring is supported at the ends of the arms by means of a latch which is held in place by bending the arms. However, it has been found that this arrangement results in the latch moving laterally due to the cyclic loads imposed on the spring.

OBJECTS AND SUMMARY OF THE INVENTION

It is an object of the invention to create a mounting device for compression springs, which is reliable in operation requires a minimum amount of space and which is readily assembled.

Briefly, the invention provides a mounting device for a compression spring which comprises a contact bridge carrier having a first and second opening and a breakthrough opening therebetween. A pull bracket, comprising a main portion which is disposed in the first opening, further includes a pair of arms which extends longitudinally from the main portion through the breakthrough and into the second opening. The coils of the springs are placed over the arms, the latter being bent back along their longitudinal axis, and a retainer washer having properly sized cutouts, including a notch on its periphery, inserted over the bent portion in such a manner that the crosspieces defining the cutouts are locked in by the bent arms. The cooperative action between the cutouts and the notch facilitate this assembly.

BRIEF DESCRIPTION OF THE DRAWINGS

FIG. 1 is a plan view taken along lines I—I in FIG. 2.

FIG. 2, a cross sectional, elevation view along line II—II of FIG. 1.

FIG. 2A is a view showing the insertion of the washer to form the final assembly.

FIG. 3 is a plan view of the washer of the invention prior to assembly.

DESCRIPTION OF THE PREFERRED EMBODIMENT

Referring to FIG. 2 there is shown a contact bridge carrier, 1, for an electromagnetic switching apparatus. This includes a first opening 20 which is connected to a second, circular, opening, 2, by a rectangular breakthrough opening 4. The openings are aligned about the longitudinal axis of the carrier.

A pull bracket, 6, comprises a main portion 21 which is disposed in the first opening. This includes a portion which surrounds the contact bridge 7 which, in turn, cooperates in a known manner with the fixed contacts, not shown, when the contact bridge carrier is moved by the switching magnet part.

The bracket 6, further includes a pair of arms 5 which are extensions of the main portion. These parallel the longitudinal axis of the carrier, extending through the breakthrough opening 4 into the circular opening 2.

A compression spring 3 is inserted over the arms 5 and rests against the bottom 8 of the hole 2. The arms extend beyond the opposite end of the spring and in the preferred embodiment, they are bent in towards each other and back along their longitudinal axis to form two U-shaped ends, 10. The height of the bend back, 17, is controlled for reasons soon to be apparent.

In the final assembled unit there is positioned a washer 9 over the bent arms. This serves to retain the spring. Referring to FIG. 3, the washer is formed from a circular slug having a diameter slightly larger than the outside diameter of the spring in which cutouts 12 and 13 are punched or otherwise suitably formed. In the preferred embodiment, cutout 13 has a width 16 formed between crosspiece 14 and the outer periphery 15 which is at least equal to the height of the bend back 17 of the U-shaped ends, 10.

Further the washer 9 includes a notch 11 on the periphery thereof which is separated from cutout 12 by crosspiece 14' and which is axially aligned and disposed relative to cutouts 12 and 13 to facilitate assembly in a manner to be described hereinafter.

FIG. 2 shows the way in which washer 9 is assembled to the device to form the final assembly. The washer 9 is inserted, notch 11 first, in the direction of the arrow between each of the arm ends, 10, until the cutout 13 coincides with the height of the bend, 17. Since the diameter of the washer 9 is slightly larger than the diameter of the spring coils, the spring is compressed by action of circumferential parts 19 thereon. By slightly swinging the washer in the cutout 13 toward the arm ends, the compression spring pushes the washer into its final position. Crosspieces 14 and 14' are locked in their respective U-shaped ends, 10. Thus the washer, and in turn the spring, is retained in the opening, 2.

With this type of arrangement, it is now possible to dispose of the mounting device in the dome of the contact bridge carrier of an electromagnetic switching apparatus of the type heretofore known without having to piece the dome from the side since lateral insertion of the retaining latch is no longer necessary. Further, insertions of the washer also enables compression of the spring without the need for separate means. Finally, the contact surfaces for the spring is now better than what is was when the latch was employed.

What is claimed is:

1. In an electrical switching apparatus, a mounting device for a contact pressure spring, said apparatus including a contact bridge carrier including first and second openings, and a breakthrough opening connecting said first opening to said second opening, each of said openings being disposed about the longitudinal axis of said carrier, and a pull bracket including a main portion and a plurality of arms extending longitudinally from the main portion, said main portion being disposed in said first opening, said plurality of arms extendng through said breakthrough opening into said second opening, the spring being disposed in said second opening, and said plurality of arms being disposed within and extending beyond the coils of the spring, the improvement comprising a washer including a plurality of crosspieces describing a plurality of cutouts correspondingly aligned with each of said plurality of arms, said plurality of arms passing through said cutouts and being bent back around a corresponding one of said crosspieces, locking said washer in place and retaining said spring.

2. The mounting device of claim 1, wherein said plurality of arms comprises two arms, said arms being bent off towards each other and back along their longitudinal axis, and wherein said cutouts of said washer comprise first and second cutouts correspondingly aligned with each of said arms, said first cutout having a width at least equal to the amount said corresponding arm is bent back along its longitudinal axis, said cutouts further comprise a notch in the periphery of said washer, said notch being aligned with and disposed relative to said two cutouts and cooperating therewith for facilitating assembly and subsequent retention by said bent back arms.

* * * * *